United States Patent [19]

Napier

[11] Patent Number: 5,097,656

[45] Date of Patent: Mar. 24, 1992

[54] DUAL PURPOSE APPARATUS FOR TURBINE ENGINE EXHAUST NOISE AND ANTI-SURGE AIR NOISE REDUCTION

[75] Inventor: James C. Napier, San Diego, Calif.

[73] Assignee: Sundstrand Corporation, Rockford, Ill.

[21] Appl. No.: 458,580

[22] Filed: Dec. 29, 1989

[51] Int. Cl.$^5$ .............................................. F02C 7/045
[52] U.S. Cl. ...................................... 60/39.5; 60/262; 181/213
[58] Field of Search ...................... 60/262, 39.29, 39.5; 181/213, 215-217, 220; 415/27, 28, 119

[56] References Cited

U.S. PATENT DOCUMENTS

| | | | |
|---|---|---|---|
| 3,210,934 | 10/1965 | Smale | 60/39.5 |
| 3,998,047 | 12/1976 | Walker | 60/39.29 |
| 4,095,417 | 6/1978 | Banthin | 60/39.5 |
| 4,214,441 | 7/1980 | Mouritsen et al. | 60/262 |
| 4,380,893 | 4/1983 | Stokes et al. | 415/27 |

Primary Examiner—Louis J. Casaregola
Attorney, Agent, or Firm—Wood, Phillips, Mason, Recktenwald & Van Santen

[57] ABSTRACT

In order to reduce turbine engine exhaust noise while simultaneously reducing anti-surge airflow noise, a combination noise reduction apparatus or tube (10) is provided having a series of holes (26) in its side. The tube (10) is in communication with a source of anti-surge air through an anti-surge air outlet (22) to be delivered into the exhaust airflow in an exhaust duct (12). The tube (10) diffuses the anti-surge air, shields the noise of the anti-surge air by dissipating the acoustic energy within the tube (10), and provides for an even distribution of the anti-surge air into the exhaust airflow. As a result, a temperature discontinuity is created in the exhaust duct (12) which results in an acoustic impedance that reflects acoustic noise back to the source of the noise.

11 Claims, 1 Drawing Sheet

DUAL PURPOSE APPARATUS FOR TURBINE ENGINE EXHAUST NOISE AND ANTI-SURGE AIR NOISE REDUCTION

FIELD OF THE INVENTION

The present invention is generally directed to a gas turbine engine which is used in auxiliary power units associated with commercial aircraft and, more particularly to, an apparatus for reducing turbine engine exhaust noise while simultaneously reducing anti-surge airflow noise originating from the gas turbine engine.

BACKGROUND OF THE INVENTION

Auxiliary power units on commercial aircraft are used to provide the aircraft with electrical and pneumatic power while the main propulsion engines of the aircraft are shut down during passenger embarking, baggage loading and unloading, and during maintenance and servicing of the aircraft. Auxiliary power units usually provide pneumatic power in the form of bleed air for the air conditioning and heating requirements of the interior cabin of commercial aircraft via control systems in accordance with the interior cabin's environmental requirements when the aircraft's main propulsion engines are not operating.

Operation of auxiliary power units is known to create two independent sources of engine noise; namely, noise originating from the turbine engine exhaust and noise originating from the anti-surge or excess bleed air which is present as the environmental control system routinely vents pressurized air. The anti-surge or excess bleed air is high pressure air required to prevent compressor surge in the auxiliary power unit at certain operating conditions and originates from the discharge of the auxiliary power unit turbine compressor which drives the interior cabin's environmental control system. The noise level generated by auxiliary power units during operation can be well in excess of acceptable noise levels for a given work environment. The conventional noise suppressors found in the prior art have typically been designed and intended to independently reduce either exhaust noise or anti-surge air noise at great expense and with inherent weight and volume limitations. Furthermore, the design and construction of such prior art devices have lacked the capacity or capability to be retrofitted to the auxiliary power units presently being used by existing aircraft, whether private, commercial, or military.

The present invention is directed toward overcoming the problems found in the prior art recited above.

SUMMARY OF THE INVENTION

Accordingly, it is a primary object of the present invention to provide an improved combination noise reduction apparatus for a turbine engine of an auxiliary power unit for an aircraft which is capable of simultaneously reducing the aggregate levels of anti-surge air noise and exhaust noise associated with operation of the turbine engine. Another object of the present invention is to provide an improved combination noise reduction apparatus for a turbine engine of an auxiliary power unit for an aircraft which may be easily retrofitted to the turbine engine by positioning within the exhaust duct of the turbine engine. Yet another object of the present invention is to provide an improved combination noise reduction apparatus for a turbine engine of an auxiliary power unit for an aircraft which has lesser weight and space requirements than presently known devices which may be applied in a retrofit manner. A still further object of the present invention is to provide an improved combination noise reduction apparatus for a turbine engine of an auxiliary power unit for an aircraft which is of simple, yet effective, design, and which results in a less costly item to manufacture.

In an exemplary embodiment of the invention there is provided a dual noise reduction apparatus for reducing selected component noise elements originating from the operation of a turbine engine of an auxiliary power unit for an aircraft. The turbine engine has an exhaust duct connected at the discharge end thereof, and the dual noise reduction apparatus is retrofittable within the space limitations of the exhaust duct. For this purpose, the apparatus comprises conduit means of a predetermined length having a first end and a second end opposite the first end. The conduit means has a plurality of holes of a predetermined size in spaced proximity to each other and located about its sides, and it is adapted to receive at the first end thereof the outlet end of an air port. With this arrangement, the apparatus includes means for securing the ends of the conduit means to the interior of the exhaust duct at a predetermined location therewithin. The conduit means causes a temperature discontinuity in the exhaust airflow resulting in an acoustic impedance within the conduit means which lowers the noise from the exhaust duct to substantially reduced levels. More specifically, the conduit means simultaneously lowers two noise components (i.e., exhaust noise and anti-surge air noise) from said exhaust duct to substantially reduced levels.

In accordance with the invention, the conduit means comprises a tube which diffuses the anti-surge air and shields the noise of the anti-surge air by dissipating the acoustic energy within the tube while at the same time providing an even distribution of the anti-surge air into the exhaust airflow of the turbine engine. Because of the temperature differences which exist between the anti-surge air and the exhaust airflow, the anti-surge air causes a temperature discontinuity which results in an acoustic impedance which acts to reflect exhaust noise back toward its source.

From the foregoing, it should now be appreciated that the present invention provides an improved combination noise reduction apparatus for a turbine engine of an auxiliary power unit for an aircraft which is capable of simultaneously reducing the aggregate levels of anti-surge air noise and exhaust noise associated with operation of the turbine engine.

Other objects, advantages and features of the present invention will become apparent from a consideration of the following specification, taken in conjunction with the accompanying drawings.

DESCRIPTION OF THE PREFERRED EMBODIMENT

Figure 1:
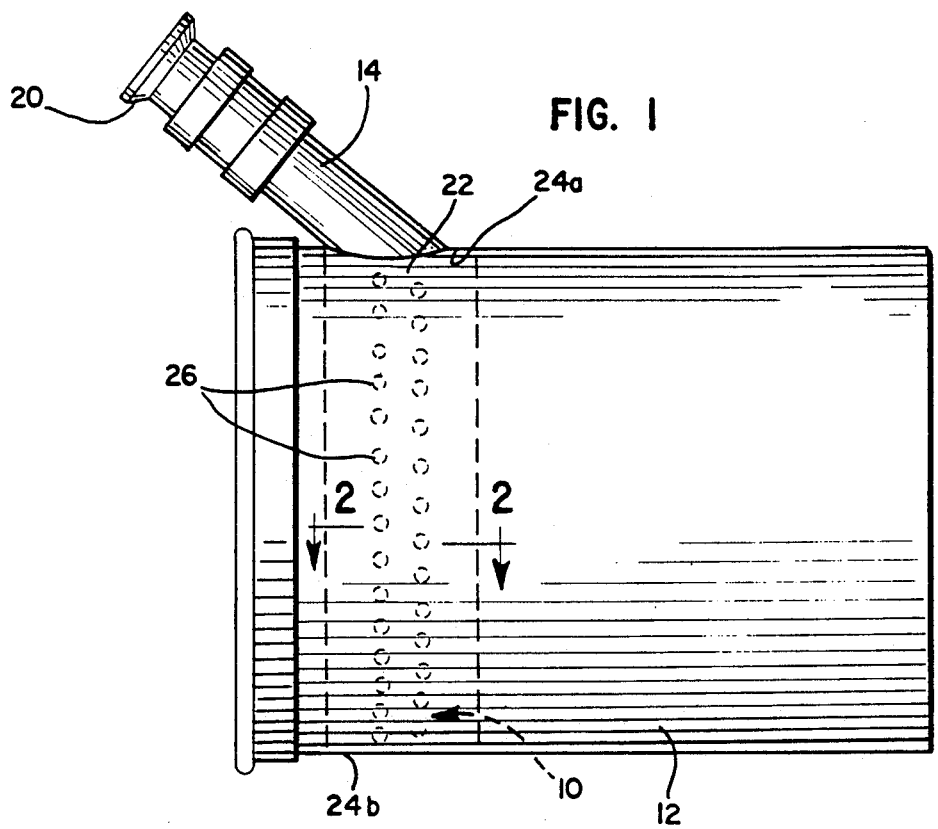
FIG. 1 is a side elevational view illustrating the combination noise reduction apparatus of the present invention in phantom lines in position within an exhaust duct for a turbine engine.

Referring now to the drawings, FIG. 1 is a side elevational view illustrating the combination noise reduction apparatus 10 of the present invention in phantom lines in position within the exhaust duct 12 of a turbine engine (not shown). The noise reduction apparatus 10 comprises an elongated hollow metal tube or conduit of a sufficient length to accommodate the particular exhaust duct 12, also preferably formed of metal, so as to be positioned therewithin and secured thereto by means such as welding. The noise reduction apparatus 10 is designed such that the elongated hollow tube or conduit is easily retrofittable into the exhaust duct 12 particularly for those installations where anti-surge air is directly vented into the exhaust duct which carries the hot exhaust from the turbine engine.

Anti-surge air is discharged at high pressure through a valve upstream of the flange 20 and is required in aircraft to prevent turbine compressor surge during certain operating conditions of the aircraft. As will be appreciated from FIGS. 1 and 3, the anti-surge air passes through an existing conduit generally designated 14 from which it is directly discharged or vented into the exhaust duct 12 by way of an anti-surge air outlet 22.

The noise reduction apparatus 10 is positioned directly beneath the anti-surge air outlet 22 within the exhaust duct 12 thereby permitting venting of the anti-surge air into the noise reduction apparatus 10. The noise reduction apparatus 10 is an elongated tube or conduit, which has each end thereof suitably sealed to the interior surface of the exhaust duct 12 at connection points 24a and 24b, and it includes various holes 26 of sufficient size to permit air passage in the sides of the noise reduction apparatus 10 to thereby permit the anti-surge air to escape the interior of the tube 10. In this manner, the anti-surge air is evenly distributed at the plane of the noise reduction apparatus 10 within the exhaust duct 12 where it meets the exhaust air flow of the turbine engine.

Figure 2:
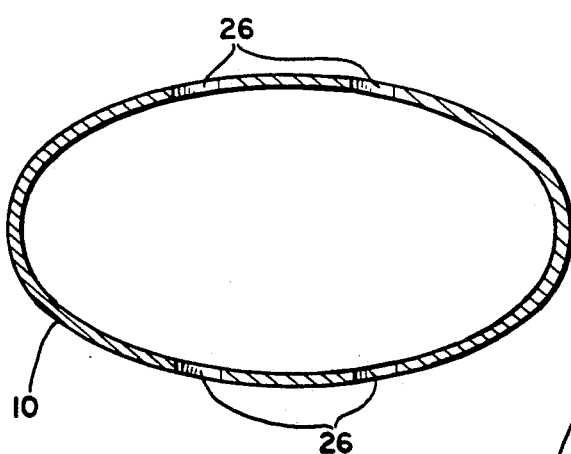
FIG. 2 is a cross-sectional view of the combination noise reduction apparatus of the present invention taken along lines 2—2 of FIG. 1.

FIG. 2 is a cross-sectional view of the combination noise reduction apparatus 10 of the present invention taken along the lines 2—2 of FIG. 1. From this view the location of the anti-surge air distribution holes 26 in the sides of the noise reduction apparatus 10 can clearly be seen, and it can also be seen that the noise reduction apparatus 10 has an external aerodynamic shape which facilitates successful operation since it does not impede flow within the exhaust duct 12. For reasons clear below, the acoustic energy of the anti-surge air is dissipated to a significant degree within the noise reduction apparatus 10.

A temperature discontinuity is created within the exhaust duct 12 generally in the plane of the noise reduction apparatus 10 where the anti-surge air enters the exhaust airflow. This is because the anti-surge air, which is evenly distributed from the interior of the noise reduction apparatus 10 through the holes 26 into the exhaust duct 12, is at a lower temperature than the exhaust airflow in the exhaust duct 12. An acoustic impedance results from this temperature discontinuity. This acoustic impedance causes sound waves normally transmitted through the exhaust duct 12 to be reflected back toward the source to thereby reduce the exhaust noise escaping with the exhaust airflow from the exhaust duct 12. In this connection, the reflection of exhaust noise is thus the result of the acoustic impedance created by the abrupt, discrete change in temperature at the location of the noise reduction apparatus 10.

In addition to the acoustic impedance previously described, the noise reduction apparatus or tube 10 will prevent anti-surge air noise from being directly propagated to downstream listening positions until its acoustic energy has been partially or entirely dissipated. This energy dissipation occurs because the sound waves present in the anti-surge air experience multiple turns and reflections within the noise reduction apparatus or tube 10 as the anti-surge air moves from the conduit 14, through the tube 10 and ultimately into the exhaust duct 12. As sound waves reflect off the inner surface of the noise reduction apparatus or tube 10, the acoustic energy will become heat energy which thereby reduces the strength or intensity of the sound waves prior to their discharge with the anti-surge air into the exhaust duct 12.

As will be appreciated, this results in a significant reduction in anti-surge noise while most advantageously assisting in reduction of exhaust noise by reason of the temperature discontinuity and resulting acoustic impedance caused by the uniform distribution of anti-surge air in the plane of the noise reduction apparatus or tube 10 as previously described.

Still further, the noise reduction apparatus or tube 10 serves to diffuse the anti-surge air to an extent that it slows the anti-surge air to a lower velocity before it is discharged into the exhaust airflow in the exhaust duct 12 to thereby produce a reduced flow noise. Accordingly, the noise reduction apparatus 10 simultaneously reduces anti-surge air noise and exhaust noise to substantially more acceptable levels by reason of the absorption of acoustic energy within the tube 10 and the temperature discontinuity in the exhaust duct 12.

Figure 3:
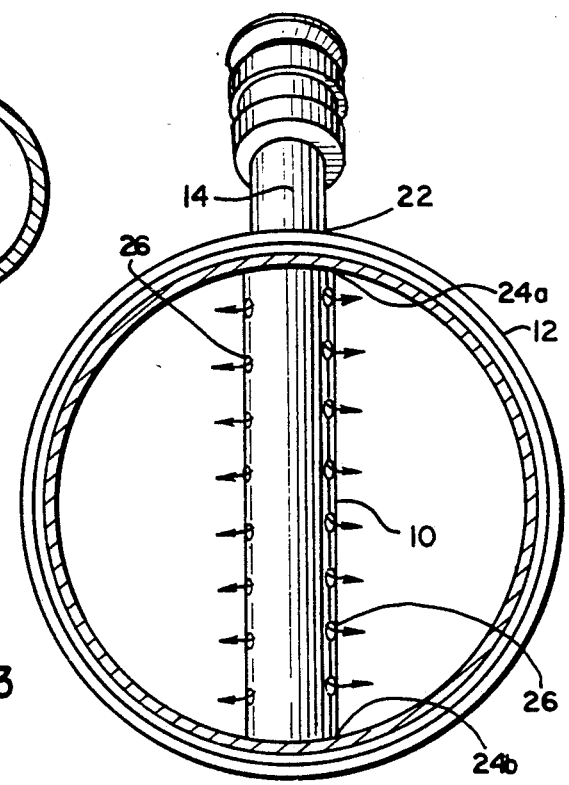
FIG. 3 is an end elevational view illustrating the combination noise reduction apparatus of the present invention in position within an exhaust duct for a turbine engine.

FIG. 3 is an end elevational view of the combination noise reduction apparatus 10 of the present invention positioned within the exhaust duct 12 for a turbine engine. The greater the length of the noise reduction apparatus 10, the greater will be the relative volume found therewithin. As will be appreciated, this will increase the number of turns and reflections which will occur in connection with the sound waves of the anti-surge air flowing through the noise reduction apparatus 10.

From the foregoing, it will be seen that the present invention is well adapted to accomplish the objects hereinabove set forth together with the other advantages which are inherent therein. Since many possible embodiments may be made of the invention, it is understood that all matters herein set forth are shown in the accompanying drawings by way of illustration only and not in a limiting sense. Thus, while the preferred embodiment of the invention has been described, variations therein will occur to those skilled in the art without departing from the true spirit and scope of the appended claims.

I claim:

1. A noise reduction apparatus for a turbine engine, said turbine engine having an exhaust duct connected at a discharge end thereof, said apparatus comprising:

conduit means of a predetermined length having a first end and a second end opposite the first end, said conduit means having a plurality of holes of a predetermined size in spaced proximity to each other and located about its sides, said conduit means receiving anti-surge air from a source through an anti-surge air outlet in said exhaust duct; and means for securing said conduit means to said exhaust duct at a predetermined location therewithin, said conduit means being in communication with said anti-surge air outlet in said exhaust duct, said predetermined location for said conduit means being in the path of exhaust airflow through said exhaust duct;

said conduit means comprising means for dissipating anti-surge air acoustic energy before said anti-surge air is discharged into said exhaust duct to cause an exhaust airflow reflective acoustic impedance.

2. The noise reduction apparatus as defined in claim 1 wherein said conduit means is aerodynamically shaped and centered within said exhaust duct to limit interference with exhaust airflow through said exhaust duct.

3. The noise reduction apparatus as defined in claim 1 wherein said energy dissipating means cause said acoustic impedance by producing a temperature discontinuity in the plane of said conduit means within said exhaust duct.

4. The noise reduction apparatus as defined in claim 3 wherein said energy dissipating means effectuates reflection of exhaust airflow acoustic energy within said exhaust duct toward a source thereof due to said temperature discontinuity.

5. The noise reduction apparatus as defined in claim 1 wherein said exhaust duct and said conduit means are formed of metal and said means for securing said ends of said conduit means to said said exhaust duct is welding.

6. A dual noise reduction apparatus for reducing selected component noise elements originating from operation of an auxiliary power unit for an aircraft, said auxiliary power unit having an exhaust duct and said apparatus being retrofittable within said exhaust duct, said apparatus comprising:

a substantially elongated hollow tube of a predetermined length having a first end and a second end opposite the first end, said tube having a plurality of holes of a predetermined size in spaced proximity to each other and located about its sides, said tube being in communication with an anti-surge air outlet at one of said ends thereof; and means for securing said first and second ends of said tube to said exhaust duct at a predetermined location therewithin, said predetermined location being in the path of exhaust airflow through said exhaust duct;

whereby said tube dissipates anti-surge air acoustic energy before discharging said anti-surge air into said exhaust duct to cause an exhaust airflow reflective acoustic impedance for reflecting exhaust noise toward a source thereof.

7. The noise reduction apparatus as defined in claim 6 wherein said tube is aerodynamically shaped and centered within said exhaust duct to limit interference with exhaust airflow through said exhaust duct.

8. The noise reduction apparatus as defined in claim 7 wherein said tube causes said acoustic impedance by producing a temperature discontinuity in the plane of said conduit means within said exhaust duct.

9. The noise reduction apparatus as defined in claim 8 wherein said tube effectuates reflection of exhaust airflow acoustic energy within said exhaust duct toward a source thereof due to said temperature discontinuity.

10. The noise reduction apparatus as defined in claim 7 wherein said holes in said tube are sized and positioned to cause said anti-surge air to be evenly distributed in the path of said exhaust airflow.

11. The noise reduction apparatus as defined in claim 7 wherein said exhaust duct and said conduit means are formed of metal and said means for securing said ends of said conduit means to said said exhaust duct is welding.

* * * * *